United States Patent
Ritchey et al.

(10) Patent No.: US 10,929,971 B2
(45) Date of Patent: Feb. 23, 2021

(54) REPRESENTATION-BASED HYBRID MODEL

(71) Applicant: Rolls-Royce Corporation, Indianapolis, IN (US)

(72) Inventors: Andrew James Ritchey, Lafayette, IN (US); Kong Ma, Carmel, IN (US); Joseph Peter Henderkott, Westfield, IN (US); Michael George Glavicic, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 142 days.

(21) Appl. No.: 16/223,503

(22) Filed: Dec. 18, 2018

(65) Prior Publication Data

US 2019/0197677 A1 Jun. 27, 2019

Related U.S. Application Data

(60) Provisional application No. 62/608,986, filed on Dec. 21, 2017.

(51) Int. Cl.
*G01N 21/88* (2006.01)
*G06T 7/00* (2017.01)
(Continued)

(52) U.S. Cl.
CPC .............. *G06T 7/001* (2013.01); *G05B 17/02* (2013.01); *G06T 15/08* (2013.01); *G06T 7/13* (2017.01);
(Continued)

(58) Field of Classification Search
CPC .. G06T 7/001; G06T 7/13; G06T 7/70; G06T 7/60; G06T 15/08; G06T 2207/10048;
(Continued)

(56) References Cited

U.S. PATENT DOCUMENTS 2,410,888 A 11/1946 Lucy
5,429,488 A 7/1995 Neu
(Continued)

FOREIGN PATENT DOCUMENTS

CN 202454772 U 9/2012
CN 103737814 A 4/2014
CN 106202728 A 12/2016

OTHER PUBLICATIONS

Chiou et al., "Model-Based Software for Simulating Ultrasonic Pulse/Echo Inspections of Metal Components", AIP Conference Proceedings 1806, Feb. 2017, 12 pgs.
(Continued)

*Primary Examiner* — Gregory M Desire
(74) *Attorney, Agent, or Firm* — Shumaker & Sieffert, P.A.

(57) ABSTRACT

The disclosure describes a method by a controller that includes: executing a model of a material based on a geometric template of the material defined by geometric parameters and at least one geometric constraint of the material; determining a value of an objective function based on differences between a three-dimensional representation of the material based on measurements of the material and the model of the material based on the geometric template of the material; and determining updated values of the geometric parameters of the geometric template. The method further includes iterating the executing the model of the material, the determining the value of the objective function, and the determining the updated values of the geometric parameters until a parameter associated with the objective function satisfies a criterion and, outputting the updated values of the geometric parameters associated with the objective function that satisfies the criterion.

18 Claims, 5 Drawing Sheets

(51) Int. Cl.
*G05B 17/02* (2006.01)
*G06T 15/08* (2011.01)
*G06T 7/13* (2017.01)
*G06T 7/60* (2017.01)
*G06T 7/70* (2017.01)

(52) U.S. Cl.
CPC .................. *G06T 7/60* (2013.01); *G06T 7/70* (2017.01); *G06T 2207/10048* (2013.01); *G06T 2207/10081* (2013.01); *G06T 2207/10132* (2013.01); *G06T 2207/30124* (2013.01)

(58) Field of Classification Search
CPC . G06T 2207/10081; G06T 2207/10132; G06T 2207/30124; G05B 17/02
See application file for complete search history.

(56) References Cited

U.S. PATENT DOCUMENTS

| | | | | |
|---|---|---|---|---|
| 5,879,489 | A * | 3/1999 | Burns | B33Y 10/00 156/64 |
| 6,214,279 | B1 * | 4/2001 | Yang | B29C 41/52 264/482 |
| 6,333,749 | B1 * | 12/2001 | Reinhardt | G01C 11/00 345/619 |
| 6,340,424 | B1 | 1/2002 | Elman et al. | |
| 6,825,856 | B1 | 11/2004 | Fazzio et al. | |
| 6,934,600 | B2 * | 8/2005 | Jang | B82Y 30/00 700/182 |
| 7,379,584 | B2 * | 5/2008 | Rubbert | A61C 7/00 382/154 |
| 8,465,200 | B2 * | 6/2013 | Sun | G06K 9/00201 374/44 |
| 10,089,413 | B2 * | 10/2018 | Wirx-Speetjens | B33Y 50/00 |
| 10,138,168 | B2 | 11/2018 | Shim | |
| 10,203,290 | B2 * | 2/2019 | Ferro | G01N 23/046 |
| 2007/0050064 | A1 | 3/2007 | Burgess et al. | |
| 2010/0023157 | A1 | 1/2010 | Burgess et al. | |
| 2013/0028478 | A1 | 1/2013 | St-Pierre et al. | |
| 2014/0257543 | A1 | 9/2014 | Rhodes et al. | |
| 2014/0257551 | A1 | 9/2014 | Junod et al. | |
| 2014/0363054 | A1 | 12/2014 | Noriega Gil et al. | |
| 2015/0160143 | A1 | 6/2015 | Henderkott et al. | |
| 2016/0083305 | A1 | 3/2016 | Goetz et al. | |
| 2016/0139587 | A1 | 5/2016 | Jarvis et al. | |
| 2016/0159698 | A1 | 6/2016 | Landwehr | |
| 2016/0214907 | A1 | 7/2016 | Shim et al. | |
| 2017/0073277 | A1 | 3/2017 | Shim et al. | |
| 2017/0252851 | A1 * | 9/2017 | Fulop | B29C 48/02 |
| 2017/0313629 | A1 | 11/2017 | Shim et al. | |
| 2019/0040553 | A1 * | 2/2019 | Hishida | D03D 11/00 |
| 2019/0185381 | A1 * | 6/2019 | Ritchey | B28B 23/0006 |
| 2019/0197677 | A1 * | 6/2019 | Ritchey | G06T 7/001 |

OTHER PUBLICATIONS

Dierig et al., "Fiber Composite Material Analysis in Aerospace Using CT Data", 4th International Symposium on NDT in Aerospace 2012, 6 pgs., Applicant points out, in accordance with MPEP 609.04(a), that the year of publication, 2012, is sufficiently earlier than the effective U.S. filing date, 2018, so that the particular month of publication is not in issue.
Green et al., "Mechanical modelling of 3D woven composites considering realistic unit cell geometry", Composite Structures, Jul. 24, 2014, 10 pgs.
Maier et al., "Analysis of Woven Fabrics and Fiber Composite Material Aerospace Parts using Industrial CT Data", 5th International Symposium on NDT in Aerospace, Nov. 13-15, 2013, 7 pgs.
Oagaro, "Heterogeneous multi-sensor data fusion using geometric transformations and Parzen windows for the nondestructive evaluation of gas transmission pipelines", Rowan University Thesis, 2004, 155 pgs., Applicant points out, in accordance with MPEP 609.04(a), that the year of publication, 2004, is sufficiently earlier than the effective U.S. filing date, 2018, so that the particular month of publication is not in issue.
Sharma et al., "Image Based Finite Element Analysis of 3D-Orthogonal Carbon-Carbon (C/C) Composite", Proceedings of the World Congress on Engineering 2010 vol. II, WCE 2010, Jun. 30-Jul. 2, 2010, 5 pgs.
Zhao, "Modeling and Rendering Fabrics at Micron-Resolution", Cornell University Dissertation, Aug. 2014, 217 pgs.
U.S. Appl. No. 62/608,986, by Rolls-Royce Corporation (Inventors: Andrew James Ritchey et al.), filed Dec. 21, 2017.

* cited by examiner

US 10,929,971 B2

REPRESENTATION-BASED HYBRID MODEL

This application claims the benefit of U.S. Provisional Application No. 62/608,986, filed Dec. 21, 2017, which is incorporated herein by reference in its entirety.

TECHNICAL FIELD

The disclosure relates to methods and systems for determining a representation of a material.

BACKGROUND

Industrial computed tomography (CT) scanning may be used to produce three-dimensional representations of scanned components. A component may be scanned by an irradiation source to generate cross-sectional images of the component at various intervals along a depth of the component. The cross-sectional images may be used to create the three-dimensional representation of the component. Industrial CT scanning may be used to inspect components for defects, measure internal sections of components, and generate models of prototypes.

SUMMARY

In some examples, the disclosure describes a method that includes executing, by a controller, a model of a material based on a geometric template of the material defined by geometric parameters and at least one geometric constraint of the material. The material includes at least two physical domains. The method further includes determining, by the controller, a value of an objective function based on differences between a three-dimensional representation of the material based on measurements of the material and the model of the material based on the geometric template of the material. The method further includes determining, by the controller, updated values of the geometric parameters of the geometric template. The method further includes iterating, by the controller, the executing the model of the material, the determining the value of the objective function, and the determining the updated values of the geometric parameters until a parameter associated with the objective function satisfies a criterion. The method further includes outputting, by the controller and in response to the parameter associated with the objective function satisfying the criterion, the updated values of the geometric parameters associated with the objective function that satisfies the criterion.

In other examples, the disclosure describes a system that includes a controller. The controller is configured to execute a model of a material based on a geometric template of the material defined by geometric parameters and at least one geometric constraint of the material. The material includes at least two physical domains. The controller is further configured to determine a value of an objective function based on differences between a three-dimensional representation of the material based on measurements of the material and the model of the material based on the geometric template of the material. The controller is further configured to determine updated values of the geometric parameters of the geometric template. The controller is further configured to iterate the execute the model of the material, the determine the value of the objective function, and the determine the updated values of the geometric parameters until a parameter associated with the objective function satisfies a criterion. The controller is further configured to output, in response to the parameter associated with the objective function satisfying the criterion, the updated values of the geometric parameters associated with the objective function that satisfies the criterion.

In other examples, the disclosure describes a computer-readable storage medium storing instructions that, when executed, cause a processor to execute a model of a material based on a geometric template of the material defined by geometric parameters and at least one geometric constraint of the material. The material includes at least two physical domains. The instructions may further cause the processor to determine a value of an objective function based on differences between a three-dimensional representation of the material based on measurements of the material and the model of the material based on the geometric template of the material. The instructions may further cause the processor to determine updated values of the geometric parameters of the geometric template. The instructions may further cause the processor to iterate the execute the model of the material, the determine the value of the objective function, and the determine the updated values of the geometric parameters until a parameter associated with the objective function satisfies a criterion. The instructions may further cause the processor to output, in response to the parameter associated with the objective function satisfying the criterion, the updated values of the geometric parameters associated with the objective function that satisfies the criterion.

The details of one or more examples are set forth in the accompanying drawings and the description below. Other features, objects, and advantages of the disclosure will be apparent from the description and drawings, and from the claims.

DETAILED DESCRIPTION

Figure 1:
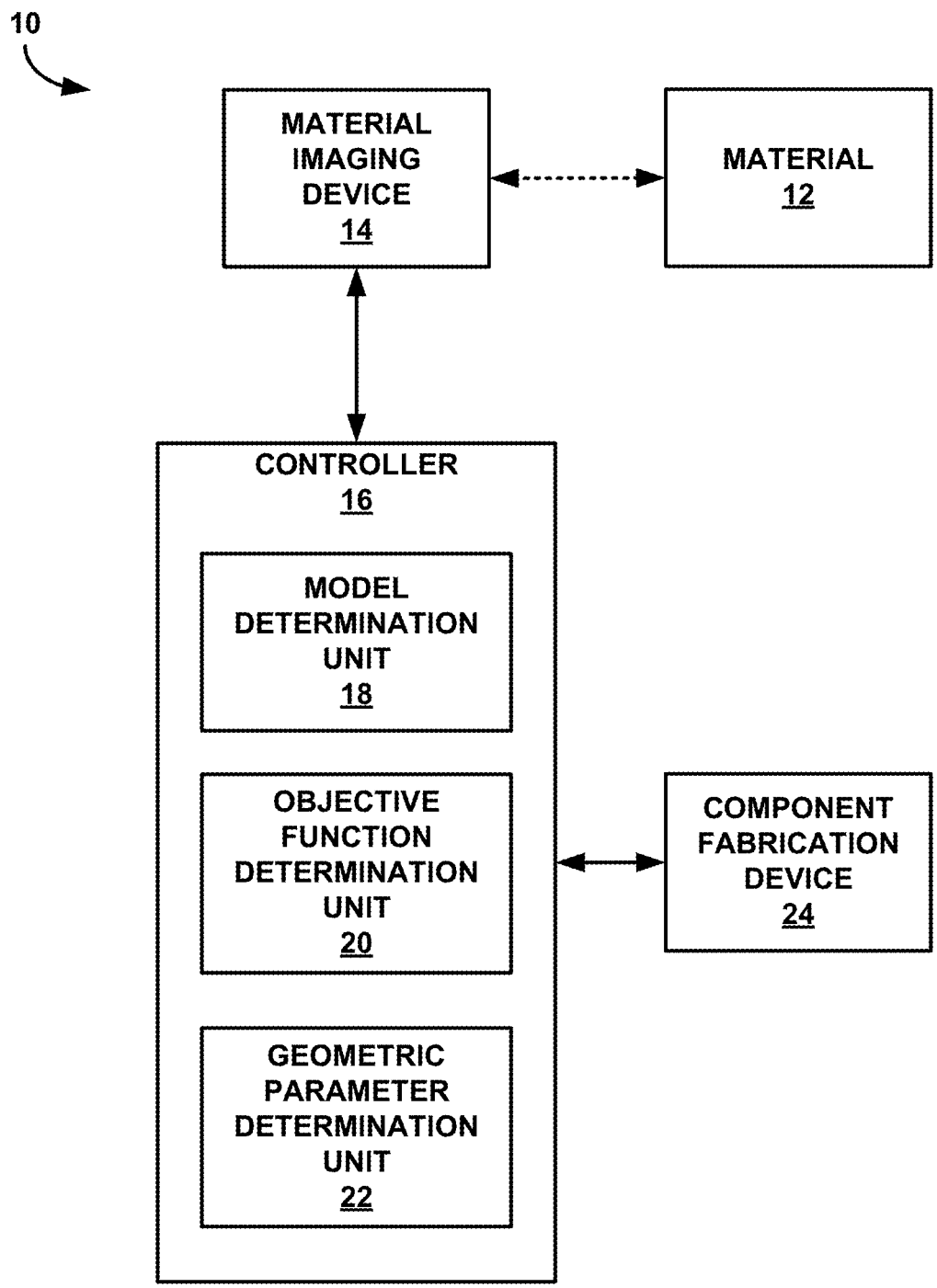
FIG. 1 is a conceptual and schematic block diagram illustrating an example system for determining values of geometric parameters for a model of a material based on a three-dimensional representation of the material.

The disclosure describes systems and techniques determining values of geometric parameters for a model of a material based on a three-dimensional representation of the material.

A component of a high temperature mechanical system may be scanned by imaging hardware to produce a three-dimensional representation of the material based on measurements of the material, such as a series of cross-sectional images or a point cloud representative of features of interest in the material. Imaging software may identify groups of pixels of the images that are likely to correspond to instances of a same morphology of the material and produce a three-dimensional model of the component from the instances of the same morphology. For materials that have more than one morphology, the imaging software may not be able to accurately differentiate between all morphologies based on the cross-sectional images. For example, in a woven material having two different orientations of tows, the tows may overlap and intertwine, such that the tows appear in the images to be joined. The imaging software may generate a model that appears to include only a single morphology, rather than two separate morphologies.

On the other hand, a material may be represented by an idealized model of the component. Modeling software may create the idealized model of the component from design or fabrication parameters. For components that experience variability in manufacturing, the idealized model may not capture the actual configuration of the component but may instead represent a design specification or gold standard component. For example, in a woven material having two different orientations of tows and a ceramic matrix material between the tows, the idealized model may not represent the actual configuration of the tows as the tows are fabricated and infiltrated. The modeling software may generate a model that deviates significantly from the actual configuration of the woven material.

According to principles of the disclosure, a system may be configured to determine updated parameters of a model of a material using a three-dimensional representation of the material. The system may utilize a geometric template of the material defined by geometric parameters and at least one geometric constraint of the material. The geometric parameters represent geometric dimensions and characteristics of the material. The geometric constraint represents a geometric limitation of the geometric parameters that may not be represented in scanned images of the material. The system may execute a model of the material based on the geometric template. The system may also utilize a three-dimensional representation of the material based on measurements of the material for information as to the actual configuration of the material. The system may adjust the geometric parameters to reduce differences between the model of the material and the three-dimensional representation of the material based on measurements of the material until the model of the material is within a tolerance of the three-dimensional representation of the material based on measurements of the material. The system may output the updated geometric parameters which represent the physical constraints of the model of the material and the physical dimensions of the actual material.

By using a three-dimensional representation of the material based on measurements of the material to determine updated geometric parameters for a model of the material, the systems and methods described herein may determine a more accurate model of the material that includes the physical limitations of the material, as represented by the parameters and constraints of the model, and the physical dimensions of the material, as represented by the three-dimensional representation of the material based on measurements of the material. For example, the updated geometric parameters of the model of the material may be used to more quickly and accurately determine whether the material is within a manufacturing tolerance, to more accurately machine a component that includes the material, and more accurately determine and assess the effects of defects of the material.

FIG. 1 is a conceptual and schematic block diagram illustrating an example system 10 for determining values of geometric parameters for a model of a material based on a three-dimensional representation of the material. System 10 includes a controller 16 and, optionally, a material imaging device 14 and/or a component fabrication device 24, each communicatively coupled to controller 16.

Material 12 may be a portion of any component of a system. In some examples, material 12 may be a portion of a component of a high temperature mechanical system. The high temperature mechanical system may be any high temperature mechanical system including, but not limited to, gas turbine engines such as turboprops, turbofans, turboshafts, turbojets, and the like.

In some examples, material 12 may include a plurality of physical domains, such as at least two physical domains. A physical domain may be a portion of material 12 defined by a collection of physical properties, such as composition, phase, density, orientation, material continuity, material bundling, and the like. In some examples, material 12 may have multiple instances of each physical domain of the plurality of physical domains. For example, in a dispersion, a dispersion medium may represent a first physical domain and each dispersed particle may represent an instance of a second physical domain.

In some examples, material 12 may include physical domains that have complex shapes and/or that have internal geometries that may not be visible externally. For example, material 12 may include a woven fabric that includes a plurality of tows oriented in a first direction and a plurality of tows oriented in a second direction. The plurality of tows oriented in the first direction may represent a first physical domain and the plurality of tows oriented in the second direction may represent a second physical domain. In some examples, the plurality of tows oriented in the first direction and second direction are made from a same composition.

Figure 2A:
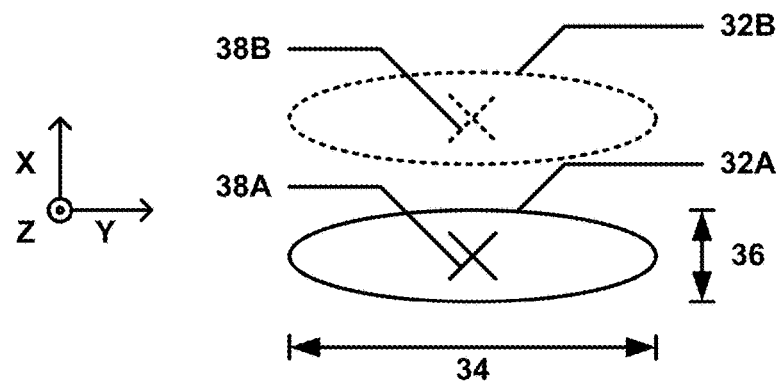
FIG. 2A is a schematic cross-sectional diagram of a tow of a woven material.
Figure 2B:
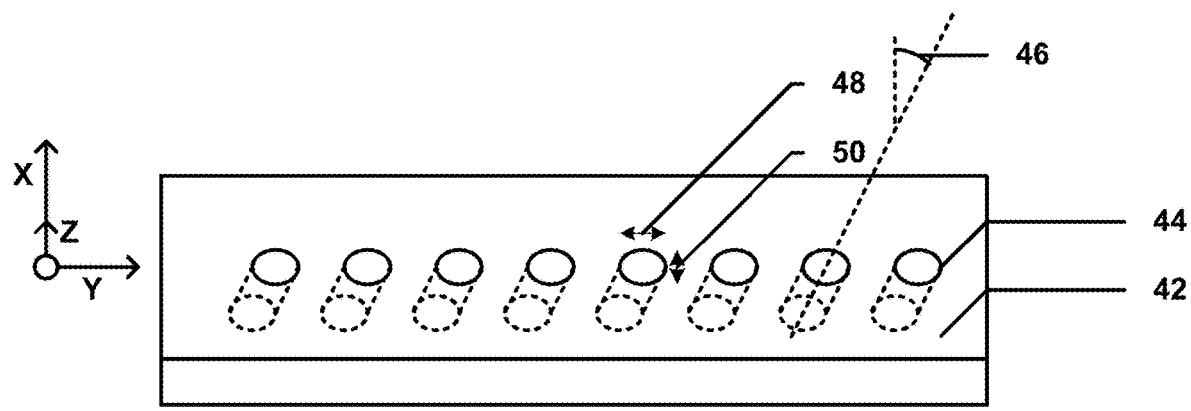
FIG. 2B is a schematic cross-sectional diagram of a portion of a turbine blade that includes cooling holes.

For example, FIG. 2A is a schematic cross-sectional diagram of a tow of a woven material. The tow may be oriented into the woven material along a z-axis (orthogonal x-, y-, and z-axes are shown in FIGS. 2A and 2B for purposes of illustration only). As the tow extends into the woven material, an x-axis position of the tow varies. The tow includes a first portion 32A of the tow at a first position along the z-axis and a first centerline position 78A along the x-axis and a second portion 32B of the tow at a second position along the z-axis and a first centerline position 38B along the y-axis. The centerline of the tow may represent a direction of the tow extending through the woven material. For example, the centerline of the tow may be defined as a sinusoid having a frequency along the z-axis and an amplitude along the x-axis. The tow may have a width 34 along the y-axis and a height 36 along the x-axis.

In some examples, material 12 may include physical domains that have different compositions. For example, material 12 may include a ceramic matrix composite that includes a ceramic fiber preform representing a first physical domain, a ceramic matrix material representing a second physical domain, and a coating representing a third physical domain. As examples, material 12 may include: a rigidized silicon carbide (SiC) preform infiltrated with a ceramic matrix material; an SiC component with a boron containing fiber coating; a carbon fiber reinforced composite; a glass fiber reinforced composite; and the like.

In some examples, material 12 may include physical domains that provide specific functions to material 12. For example, material 12 may include a turbine blade that includes internal cooling channels. The internal cooling channels may be machined into the turbine blade and configured to provide a cooling function to the turbine blade. The internal cooling channels may represent a first physical domain and the turbine blade may represent a second physical domain.

For example, FIG. 2B is a schematic cross-sectional diagram of a portion of a turbine blade that includes cooling holes. Each cooling hole 44 may extend through the portion 42 of the turbine blade. Each cooling hole may have a size, such as defined by a width 48 and length 50, and an alignment, defined by an angle 46 from normal. The cooling holes 44 may have other properties in relation to portion 42 of the turbine blade, such as a spacing, areal density, and the like.

In some examples, material 12 may contain defects in one or more physical domains of material 12. For example, material 12 may be a woven fabric in which one or more tows has a raised surface that deviates from a desired form of the tow. As another example, material 12 may be an SiC/SiC ceramic matric composite component that has various delaminations, voids, or the like that appear in various shapes, such as ovals.

In some examples, system 10 includes material imaging device 14. Material imaging device 14 may be configured to generate a three-dimensional representation of material 12, such as a plurality of images of material 12, a point cloud representing three-dimensional geometry of material 12, or the like. An image may include any image that represents a cross-section or surface of material 12 including, but not limited to tomographs, photographs, and the like.

Material imaging device 14 may be configured to emit imaging waves at material 12 and detect reflected, refracted, or transmitted imaging waves from material 12. Material imaging device 14 may use a variety of techniques to generate the three-dimensional representation of material 12. In some examples, material imaging device 14 may be a non-contact tomography system that uses any of a variety of techniques including, but not limited to, atom probe tomography, computed tomography imaging spectrometry, computed tomography of chemiluminescence, confocal microscopy, cryo-electron tomography, electrical capacitance tomography, electrical capacitance volume tomography, electrical resistivity tomography, electrical impedance tomography, electron tomography, focal plane tomography, functional magnetic resonance imaging, hydraulic tomography fluid flow, infrared microtomographic imaging, laser ablation tomography, magnetic induction tomography, magnetic resonance imaging or nuclear magnetic resonance tomography, muon tomography, microwave tomography, neutron tomography, ocean acoustic tomography, optical coherence tomography, optical diffusion tomography, optical projection tomography, photoacoustic spectroscopy, positron emission tomography, quantum tomography, single photon emission computed tomography, seismic tomography, terahertz tomography, thermoacoustic spectroscopy, photoacoustic spectroscopy, ultrasound computer tomography, ultrasound transmission tomography, x-ray computed tomography, Zeeman-Doppler imaging, and the like.

The three-dimensional representation of material 12 may be based on measurements of material 12. Measurements of material 12 may include any dimensions or reference points of material 12 that correspond to a physical geometry of material 12. For example, measurements may include image coordinates of pixels of a plurality of images of material 12 that correspond to material 12. In some examples, the three-dimensional representation of material 12 may be a tomograph of material 12. A tomograph may be an x-axis and y-axis representation of material 12 associated with a z-axis position of a depth of material 12 along the perspective. For example, the three-dimensional representation of material 12 may include a plurality of images of material 12, which may be defined parallel to a plane defined by the x-axis and a y-axis, while each image number of the plurality of images may be defined along the z-axis perpendicular to the plane. Each image of the plurality of images of material 12 may represent a cross-section of material 12 at a particular depth of material 12 along the z-axis. The particular depth of material 12 for an image may represent a control point of material 12 in the three-dimensional representation of material 12, such that a plurality of images of material 12 may correspond to a plurality of control points of material 12. A control point may be any point at which data points of the three-dimensional representation and data points of the model may be compared. For example, if the three-dimensional representation includes a plurality of tomographic images, each tomographic image may correspond to a control point at which image coordinates of each tomographic image may be compared to a model of material 12.

Component imaging device 14 may be communicatively coupled to controller 16 and configured to output the three-dimensional representation of material 12 to controller 16. For example, component imaging device 14 may be configured to send a signal to controller 16 that represents the three-dimensional representation of material 12 at the perspective. In some examples, component imaging device 14 may be configured to receive command signals from a controller, such as controller 16. For example, component imaging device 14 may be configured to receive a scan signal from controller 16 that includes a scanning pattern, such as a depth increment, and generate the plurality of images of material 12 based on the scan signal.

System 10 includes controller 16. Controller 16 may be communicatively coupled to material imaging device 14 and/or component fabrication device 24. Controller 16 may include any one or more of a wide range of devices, including processors (e.g., one or more microprocessors, one or more application specific integrated circuits (ASICs), one or more field programmable gate arrays (FPGAs), or the like), one or more servers, one or more desktop computers, one or more notebook (i.e., laptop) computers, one or more cloud computing clusters, or the like. Controller 16 may include model determination unit 18, objective function determination unit 20, and geometric parameter determination unit 22. Model determination unit 18, objective function determination unit 20, and geometric parameter determination unit 22 may perform operations described using software, hardware, firmware, or a mixture of hardware, software, and firmware residing in and/or executing at controller 16. Model determination unit 18, objective function determination unit 20, and geometric parameter determination unit 22 may execute as one or more services of an operating system or at an application layer of a computing platform of controller 16.

Controller 16 also may be communicatively coupled to and configured to control components of system 10. For example, controller 16 may be configured to cause component imaging device 14 to generate the plurality of images of material 12 and the three-dimensional representation of material 12 based on the plurality of images of material 12.

In some examples, controller 16 may be communicatively coupled to storage systems outside system 10. For example, controller 16 may be communicatively coupled to storage systems that store a three-dimensional representation of material 12, such as cross-sectional images of material 12, such that controller 16 may send a request to the systems to retrieve the three-dimensional representation of material 12.

Controller 16 may be configured to receive a three-dimensional representation of material 12. For example, controller 16 may be configured to receive a signal from component imaging device 14 that includes the three-dimensional representation of material 12. In examples in which the three-dimensional representation includes a plurality of images, each image of the plurality of images may include a plurality of pixels that define an x-axis and y-axis of the image. Each image of the plurality of image may define a z-axis position within the plurality of pixels that may correspond to a depth of material 12 perpendicular to the plane of the image. Each pixel of the plurality of pixels may have a color value. Controller 12 may be configured to create a stack of the plurality of images.

Controller 16 also may be configured to receive a geometric template of material 12. For example, controller 16 may be configured to receive a template signal that represents the geometric template of material 12 from, for example, a storage location or another computing device. The geometric template of material 12 may include a geometric representation of material 12. The geometric template of material 12 may be defined by one or more geometric parameters. A geometric parameter may be any parameter of material 12 that defines a dimension, property, or characteristic of a physical domain of material 12. Geometric parameters that may be used include, but are not limited to, shapes, sizes, lengths, widths, heights, angles, frequencies, periodicities, amplitudes, spacings, continuity, and the like, of a physical domain of material 12. The geometric template may also be defined by at least one geometric constraint. A geometric constraint may be a condition, range, rule, or limit of a geometric parameter that relates to a physical constraint of material 12. In some examples, geometric constraints may be relative physical constraints between physical domains, such as a prohibition of overlap of two physical domains. In other example, geometric constraints may be absolute physical constraints for a single physical domain, such as a maximum or minimum dimensional limit. Geometric constraints that may be used include, but are not limited to, boundary conditions, bulk conditions, physical domain interactions, dimension limits, orientations, and the like. In some examples, the geometric constraint may be a boundary condition of a surface of a physical domain. For example, the geometric constraint may be a relative or absolute dimension or dimensions of one or more physical domains.

As an example, a geometric template of a woven material that includes the tow of FIG. 2A may be defined by geometric parameters of the tow. For example, the centerline of the tow may be defined by a spline having various control points, such as the first z-axis position of the first portion 32A and the second z-axis position of the second portion 32B. The spline may be defined by a frequency along the z-axis and an amplitude along the x-axis. The dimensions of the tow may be defined by the width 34 along the y-axis and the height 36 along the x-axis. The geometric template may further include a geometric constraint of the tow. For example, the tow may not overlap (i.e., occupy a same volume) with another tow in the woven material.

As another example, a geometric template of cooling holes in the portion 42 of the turbine blade of FIG. 2B may be defined by geometric parameters of cooling hole 46. For example, the centerline of cooling hole 46 may be defined by a line having various control points, such as various depths along cooling hole 46. The centerline may be defined by angle 46 from normal. The dimensions of cooling hole 46 may be defined by width 48 and length 50, as well as other dimension not shown, such as depth, taper, and the like. The geometric template may further include a geometric constraint of cooling hole 46 or portion 42 of the turbine blade with respect to cooling holes. For example, cooling hole 46 may not overlap with another cooling hole.

Model determination unit 18 may be configured to execute a model of material 12 based on the geometric template of material 12 and values of the geometric parameters. The model may represent the parameterized geometric template that includes values for the geometric parameters. Initial values for the geometric parameters may be provided from a data set, such as a data set associated with fabrication commands for material 12. Updated values for the geometric parameters may be provided by geometric parameter determination unit 22. The resulting model may be represented as voxels having coordinates for an x-axis, y-axis, and z-axis, a finite element model, or the like.

Objective function determination unit 20 may be configured to determine a value of an objective function. The objection function may be based on differences between the three-dimensional representation of material 12 and the model of material 12. For example, in response to receiving updated values of the geometric parameters, objective function determination unit 20 may be configured to determine an updated value of the objection function based on differences between the three-dimensional representation of material 12 and the updated model of material 12 based on the updated values of the geometric parameters.

Geometric parameter determination unit 22 may be configured to determine updated values of the geometric parameters. For example, geometric parameter determination unit 22 may adjust the values of the geometric parameters in order to reduce a value of the objective function. In some examples, geometric parameter determination unit 22 may be configured to determine updated values of the geometric parameters be reducing net respective differences between the respective coordinates of the three-dimensional representation and the model for a plurality of control points of material 12, such as a plurality of images corresponding to the control points of material 12.

Controller 16 may be configured to iterate the execution of the model of material 12, the determination of the value of the objection function, and the determination of the updated values of the geometric parameters until a parameter associated with the objective function satisfies a criterion. For example, the criterion may be a user-specified tolerance of a difference between the respective coordinates of the three-dimensional representation and the respective coordinates of the model, such as a tolerance related to an accuracy of material imaging device 14, while in other examples, the criterion may be a user-specified number of iterations. In some examples, the parameter associated with the objective function may be a derivative of the objective function (e.g. a rate of change of a difference) or any other measure by which a reduction of the objection function may satisfy the criterion.

Controller 16 may be configured to output values of the geometric parameters. For example, in response to the parameter associated with the objective function satisfying the criterion, controller 16 may be configured to output the updated values of the geometric parameters associated with the value of the objective function that satisfies the criterion.

Updated values of the geometric parameters determined by controller 16 may be used, such as by controller 16 or another computing device of a communicatively coupled system, to perform a variety of operations related to material 12. The updated values may more accurately reflect the physical characteristics of material 12 than geometric values obtained by either imaging or modeling. For example, the updated values may reflect advantageous characteristics of modeling, such as a more accurate representation of structural properties, and advantageous characteristics of imaging, such as a more accurate representation of structural dimensions.

In some examples, the updated values of the geometric parameters may be used for quality control of material 12. For example, controller 16 may be further configured to determine a hybrid model of a component of material 12 based on updated values of the geometric parameters. The hybrid model may represent a model of the component of material 12 having the updated values of the geometric parameters. Controller 16 may be configured to evaluate whether the hybrid model is within a dimensional tolerance. In response to determining that the hybrid model is not within the dimensional tolerance, controller 16 may be configured to indicate that material 12 should be rejected. In response to determining that the hybrid model is within the dimensional tolerance, controller 16 may be configured to indicate that material 12 is acceptable.

In some examples, material 12 may include at least one defect, the geometric template may include a geometric template for the at least one defect, and the model may be a model of the at least one defect. For example, the geometric template and model may be a geometric template and model for material 12 that includes the defect, or may be a geometric template and model for the specific portion of material 12 that includes the defect. Controller 16 may be further configured to identify the at least one defect from the three-dimensional representation of material 12. For example, controller 16 may be configured to determine a difference between coordinates of the three-dimensional representation that exceed an anticipated or allowed deviation that indicates a defect. Controller 16 may be further configured to select, such as from database, the geometric template of the at least one defect. For example, controller 16 may be configured to send a request to a computing device that includes the database for the model of the at least one defect. Once controller 16 has determined updated values of the geometric parameters, controller 16 may be configured to classify a severity of the at least one defect based on the updated geometric parameters and output an indication of the severity classification. Further operation of controller 16 for determining a severity of a defect will be described in FIG. 4 below.

In some examples, the updated values of the geometric parameters may be used to determine machining paths for machining components. Controller 16 may be communicatively coupled to component fabrication device 24, such as a controller of component fabrication device. Controller 16 may be configured to send a command that includes the updated geometric parameters. Further operation of controller 16 for determination of machining paths may be described in FIG. 3 below.

In some examples, system 10 may include component fabrication device 26. Component fabrication device 26 may be communicatively coupled to controller 16. Component fabrication device 26 may be configured to machine a component that includes material 12. A variety of tooling fabrication units 18 may be used including, but not limited to, machining tools, such as grinders and mills; die cast molding machines; and the like.

In some examples, component fabrication device 26 may be configured to use the updated geometric values to machine a component associated with material 12. For example, component fabrication device 18 may be configured to receive a component fabrication command from controller 16 that includes a hybrid model based on the updated values of the geometric parameters. Component fabrication device 24 may include a computing device that is configured to determine a machining path based on the hybrid model. Component fabrication device 24 may be configured to manufacture a component based on the machining paths. Further operation of component fabrication device 26 may be described in FIG. 3 below.

Figure 3:
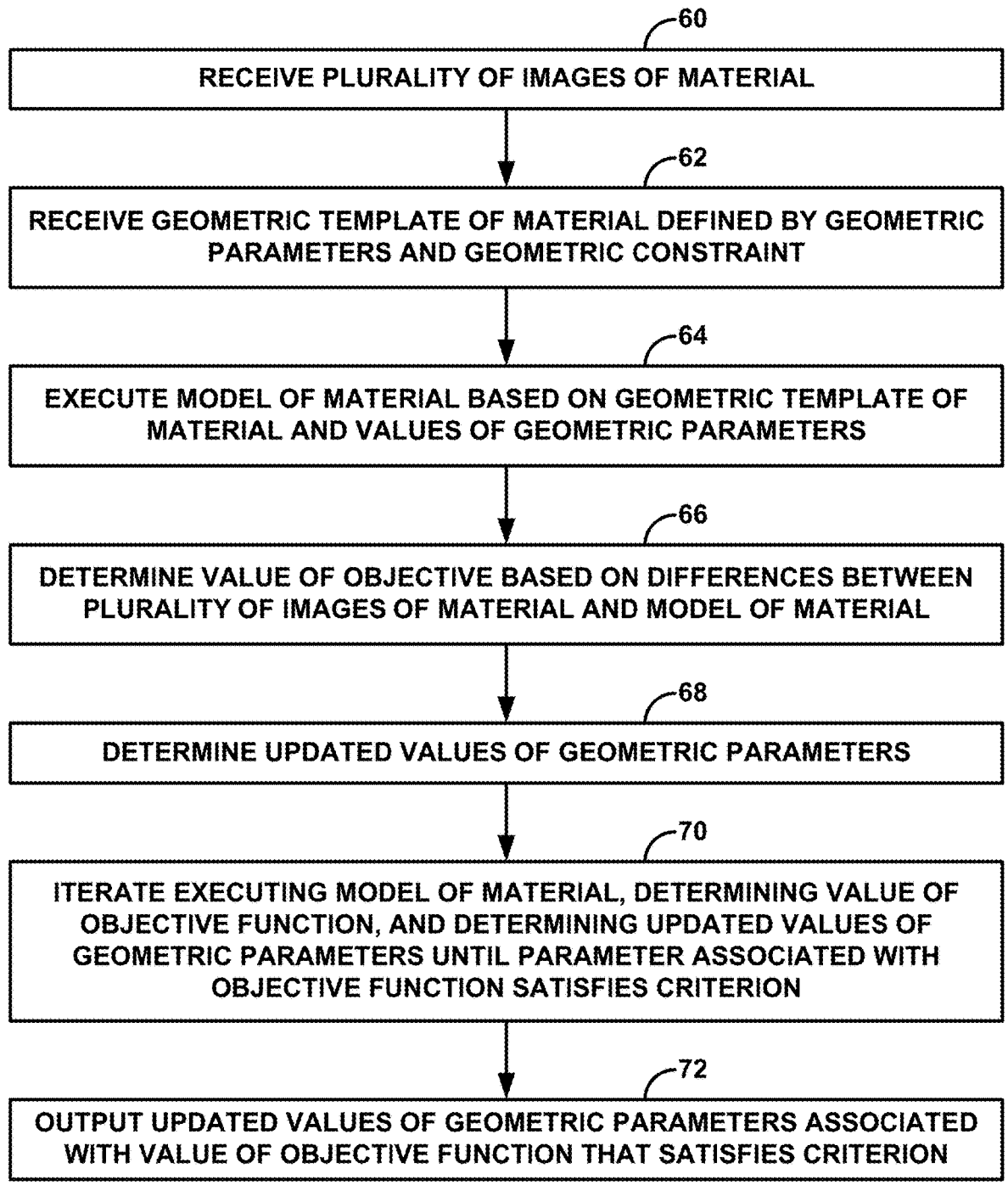
FIG. 3 is a flow diagram illustrating an example technique for determining values of geometric parameters for a model of a material based on a three-dimensional representation of the material.

FIG. 3 is a flow diagram illustrating an example technique for determining values of geometric parameters for a model of a material based on a three-dimensional representation of the material. The technique of FIG. 3 will be described with concurrent reference to system 10 of FIG. 1, although one of ordinary skill will understand that the technique of FIG. 3 may be performed by other systems that include a greater or fewer number of components, and that system 10 may perform other techniques. For example, one or more control steps performed by controller 16 may be performed manually or by using another component of system 10.

Controller 16 may receive a three-dimensional representation of material 12 (60). For example, controller 16 may receive a signal from component imaging device 14 that includes the three-dimensional representation of material 12. In examples in which the three-dimensional representation includes a plurality of images, each of the plurality of images may include a plurality of pixels that define an x-axis and y-axis of the image. Each image of the plurality of image may define a z-axis position within the plurality of pixels that may correspond to a depth of material 12 perpendicular to the plane of the image. Each pixel of the plurality of pixels may have a color value. Controller 12 may create a stack of the plurality of images. In some examples, controller 16 may further process the plurality of images of material 12. For example, controller 16 may threshold the plurality of pixels of each image of the plurality of images to increase contrast of each image. As another example, controller 16 may, for each of the plurality of images of material 12, identify pluralities of pixels that are likely to be associated with a physical domain of material 12. Controller 16 may determine coordinates that correspond to the physical domains, such as x-axis, y-axis, and z-axis coordinates that correspond to a surface or boundary of an instance of a physical domain. In some examples, controller 16 may create a three-dimensional representation of material 12 from the plurality of images of material 12. For example, as will be explained below, data points from the plurality of images may be compared with data points from a model of material 12. By creating a three-dimensional representation of material 12, controller 16 may not be limited to only using data points that correspond directly to data points from the plurality of images. For example, a data point may be selected that does not correspond to a depth of either of two adjacent images, but may be determined based on interpolation between the two adjacent images.

Controller 16 may receive a geometric template of the material defined by geometric parameters and at least one geometric constraint of the material (62). For example, controller 16 may receive a template signal that includes data that represents the geometric template of material 12 from, for example, a storage location or another computing device. The geometric template of material 12 may be a geometric representation of material 12.

The geometric template of material 12 may be defined by one or more geometric parameters. A geometric parameter may be any parameter of material 12 that defines a dimension, property, or characteristic of a physical domain of material 12. Geometric parameters that may be used include, but are not limited to, shapes, sizes, lengths, widths, heights, angles, frequencies, periodicities, amplitudes, spacings, continuity, and the like, of a physical domain of material 12. The geometric template may be generally represented by the following equation:

$$T = T(x_i)$$

In the above equation, T is the geometric template of material 12 and $x_i$ is one or more geometric parameters of material 12.

The geometric template may also be defined by at least one geometric constraint. A geometric constraint may be a condition, range, rule, or limit of a geometric parameter that relates to a physical constraint of material 12. In some examples, geometric constraints may be relative physical constraints between physical domains, such as a prohibition of overlap of two physical domains. In other example, geometric constraints may be absolute physical constraints for a single physical domain, such as a maximum or minimum dimensional limit. Geometric constraints that may be used include, but are not limited to, boundary conditions, bulk conditions, physical domain interactions, dimension limits, orientations, and the like. In some examples, the geometric constraint may be a boundary condition of a surface of a physical domain. For example, the geometric constraint may be a relative or absolute dimension or dimensions of one or more physical domains. In some examples, the at least one geometric constraint comprises at least one of a dimension limit, a boundary condition, or an orientation of a component of the material.

Controller 16, such as model determination unit 18, may execute a model of the material based on the geometric template of the material and values of the geometric parameters (64). The model may represent a parameterized geometric template that includes initial values for the geometric parameters. The initial values for the geometric parameters may be provided from a data set, such as a known data set of expected dimensions of material 12 or a data set associated with fabrication of material 12. For example, the data set may be a data set of expected dimensions used to fabricate material 12. The resulting model may be represented as data points corresponding to voxels having coordinates at an x-axis, y-axis, and z-axis. The model of material 12 may be generally represented by the following equation:

$$T_j = \operatorname*{ave}_j \{T\}$$

In the above equation, $T_j$ is a data point of the model for the value j of the geometric parameter value and ave{T} is an average value of a voxel representing the data point.

Controller 16, such as objective function determination unit 20, may determine a value of an objective function based on differences between the three-dimensional representation of material 12 and the model of material 12 (66).

In some examples, the objective function may be based on differences between dimensions of one or more physical domains represented at a plurality of control points in the three-dimensional representation of material 12, such as each image of a plurality of images of material 12, and dimensions of the one or more physical domains represented in the model of material 12 that correspond to the plurality of control points of the three-dimensional representation of material 12.

Objective function determination unit 20 may determine the value of the objection function at various control points for the three-dimensional representation of material 12 and the model of material 12. A control point may be any point at which data points of the plurality of images and data points of the model may be compared. For example, the control point may be a depth of material 12 that corresponds to an image of the plurality of images.

Objective function determination unit 20 may determine a set of data points of the three-dimensional representation of material 12 at each control point. In examples where the three-dimensional representation of material 12 includes a plurality of images, objective function determination unit 20 may determine a set of data points for each image of the plurality of images. The set of data points of the three-dimensional representation may correspond to pixels of the image and may include color values that correspond to x-axis, y-axis, and z-axis coordinates (i.e., x-axis and y-axis as pixels of the image, z-axis as number or depth of the image) for the image. In some examples, the set of data points may include all pixels of an image, while in other examples, the set of data point may include pixels that correspond to boundaries of physical domains of material 12 represented in the image. Objective function determination unit may determine respective representation coordinates for each data point of the set of data points of the three-dimensional representation corresponding to the control point of material 12. Objective function determination unit 20 may repeat this determination for all control points. For example, objective function determination unit 20 may determine respective image coordinates for each data point of the set of data points of each image of the plurality of images of material 12.

Objective function determination unit 20 may determine a set of data points of the model of material 12 at each control point. The set of data points of the model may correspond to voxels of the model at each control point and may include color values that correspond to x-axis, y-axis, and z-axis coordinates (i.e., x-axis and y-axis as pixels of the image, z-axis as number or depth of the image) for model at the control point. In some examples, the set of data points may include all voxels of the model at the control point, while in other examples, the set of data point may include voxels at the control point that correspond to boundaries of physical domains of material 12 represented in the model at the control point. Objective function determination unit 20 may determine respective model coordinates for each data point of the set of data points of the model corresponding to the control point of the material. Objective function determination unit 20 may repeat this determination for all control points.

Objective function determination unit 20 may determine respective differences between the respective representation coordinates of the three-dimensional representation and the respective model coordinates of the model at each control point of a plurality of control points. For example, objective function determination unit 20 may compare a color value of an image coordinate (e.g., 0 or 1) and a color value of a model coordinate (e.g., 0 of 1). Objective function determination unit 20 may determine a difference between the color value of the image coordinate and the color value of the model coordinate. Objective function determination unit 20 may repeat the comparison for all representation coordinates and model coordinates at each control point.

In examples where the set of data points represents characteristics of physical domains of material 12, objective function determination unit 20 may compare values other than color values. For example, the representation coordinates and model coordinates may correspond to a boundary of an instance of a physical domain, such as a shape of a tow of a woven material, and a reference point of the instance of the physical domain, such as a center point of the tow. Objective function determination unit 20 may compare dimensions of the boundary of the instance of the physical domain and the position of the reference point to determine the respective difference between the respective representation coordinates of the three-dimensional representation and the respective model coordinates of the model at each control point. In some examples, at least one data point of the set of data points of the three-dimensional representation and at least one data point of the set of data points of the model corresponds to a boundary of the material.

In some examples, the objective function may be represented by the following equation:

$$O(x_i) = \sum_{j=0}^{n} (I_j - T_j)^2$$

In the above equation, $x_i$ is the geometric parameters, $O(x_i)$ is the value of the objective function, n is a control point, $I_j$ represents a data point of the three-dimensional representation, and $T_j$ represents a corresponding data points of the model.

Controller 16, such as geometric parameter determination unit 20, may determine updated values of the geometric parameters (68). For example, geometric parameter determination unit 22 may adjust the values of the geometric parameters in order to reduce the objective function. In some examples, geometric parameter determination unit 22 may determine updated values of the geometric parameters by reducing the net respective differences between the respective coordinates of the three-dimensional representation and the model for the plurality of images.

Controller 16 may iterate the execution of the model of material 12 (64), the determination of the value of the objection function (66), and the determination of updated values of the geometric parameters (68) until a parameter associated with the objective function satisfies a criterion (70). For example, model determination unit 18 may receive the updated values of the geometric parameters from geometric parameter determination unit 22 and execute an updated model of material 12 based on the updated geometric parameters. Objective function determination unit 20 may receive the updated model of material 12 and determine an updated value of the objective function based on the updated model of material 12. The satisfaction of the criterion by the parameter associated with the objective function may be represented by the following equation:

$$O(x_i) \leq \varepsilon$$

In the above equation, $O(x_i)$ is the parameter associated with the objective function and $\varepsilon$ is the criterion. The criterion may be a user-specified tolerance of a difference between the respective coordinates of the three-dimensional representation and the respective coordinates of the model, such as a tolerance related to an accuracy of material imaging device 14, while in other examples, the criterion may be a user-specified number of iterations.

Controller 16 may output, in response to the parameter associated with the objective function satisfying the criterion, the updated values of the geometric parameters associated with the value of the objective function that satisfies the criterion (72). Controller 16 may send a signal that includes the geometric parameters.

In some examples, the updated values of the geometric parameters may be used for quality control. For example, controller 16 may compare the updated values of the geometric parameters with various tolerances or limits of the geometric parameters. If the geometric parameters exceed a limit, controller 16 may determine that material 12 does not exhibit sufficient geometric conformity. By using geometric parameters to evaluate geometric conformity, controller 16 may quickly evaluate geometric conformity compared to systems that use non-parameterized metrics to evaluate geometric conformity.

Figure 4:
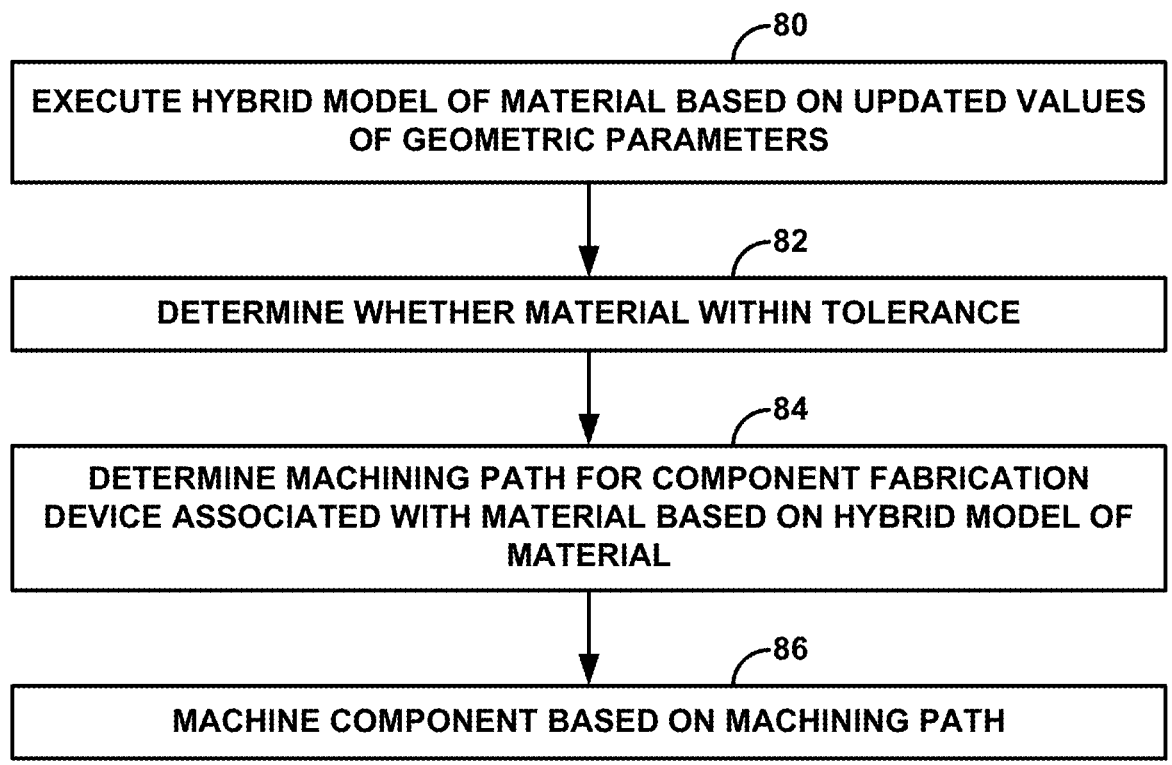
FIG. 4 is a flow diagram illustrating an example technique for determining whether a material is within a tolerance and/or fabricating a component from the material based on the updated values of geometric parameters for a model of the material.

In some examples, the updated values of the geometric parameters may be used for quality control of material 12 and/or to determine machining paths for machining components. FIG. 4 is a flow diagram illustrating an example technique for determining whether material 12 is within a tolerance and/or fabricating a component from material 12 based on updated values of geometric parameters. The technique of FIG. 3 will be described with concurrent reference to system 10 of FIG. 1 and the technique of FIG. 2, although one of ordinary skill will understand that the technique of FIG. 3 may be performed by other systems that include a greater or fewer number of components, and that system 10 may perform other techniques. For example, one or more control steps performed by controller 16 may be performed manually or by using another component of system 10.

Controller 16, or another controller that receives the outputted updated values of the geometric parameters of material 12, may execute a hybrid model of a component of the material based on the updated values of the geometric parameters (80). The hybrid model of the component may represent a model of the component having the updated values of the geometric parameters of material 12. For example, the hybrid model may include the geometric template of material 12 with the updated values of the geometric parameters of material 12.

Controller 16 may determine whether the hybrid model is within a tolerance of the component (82). In some examples, the tolerance may be a dimensional tolerance. For example, controller 16 may select various data points corresponding to a surface of a hybrid model of a tow of a woven material and determine whether the various points are within the dimensional tolerance of the tow. The dimensional tolerance of the component may include a maximum deviation, a maximum or minimum dimension, and the like. In some examples, the tolerance may be a functional tolerance. For example, controller 16 may execute a dynamic model of a turbine blade that includes cooling channels. Controller 16 may determine whether the cooling values are within the functional tolerance for the turbine blade.

In response to determining that the hybrid model is not within the tolerance, controller 16 may indicate, such as by sending an indication signal to a display device, that material 12 should be rejected. In response to determining that the hybrid model is within the dimensional tolerance, controller 16 may be configured to indicate that material 12 should be accepted.

By utilizing the hybrid model of material 12 to determine whether a component of material 12 is within a tolerance, controller 16 may accurately evaluate the component compared to a system that does not use a hybrid model. For example, controller 16 may various material dynamics may not be captured by only using imaging or only using modeling. By using both imaging of material 12 and modeling of material 12 to develop the hybrid model of material 12, controller 16 may more accurately evaluate characteristics of material 12.

In some examples, the component of material 12 may be an intermediate that is intended to undergo further machining. For example, the component may be a turbine blade and the material may be a ceramic matrix composite. The component may be further machined with cooling holes, such as in FIG. 2B.

In response to determining that the hybrid model of material 12 is within the tolerance, controller 16 may determine at least one machining path of component fabrication device 24 associated with material 12 based on the hybrid model of material 12 (84). For example, controller 16 may determine coordinates of physical domains of material 12, such as positions and dimensions of cooling holes of a turbine blade. Controller 16 may determine a machining path for the coordinates of the physical domains that will result in fabrication of the physical domains in material 12. For example, the machining path may include coordinates of the machining tools that correspond to the positions and dimensions of the cooling holes. Controller 16 may output the at least one machining path to the component fabrication device. Component fabrication device 24 may receive the at least one machining path from controller 16 and machine the component based on the at least one machining path (86). By utilizing the hybrid model of material 12 to machine a component of material 12, controller 16 may more accurately machine a component than a system that does use a model based on imaging.

Figure 5:
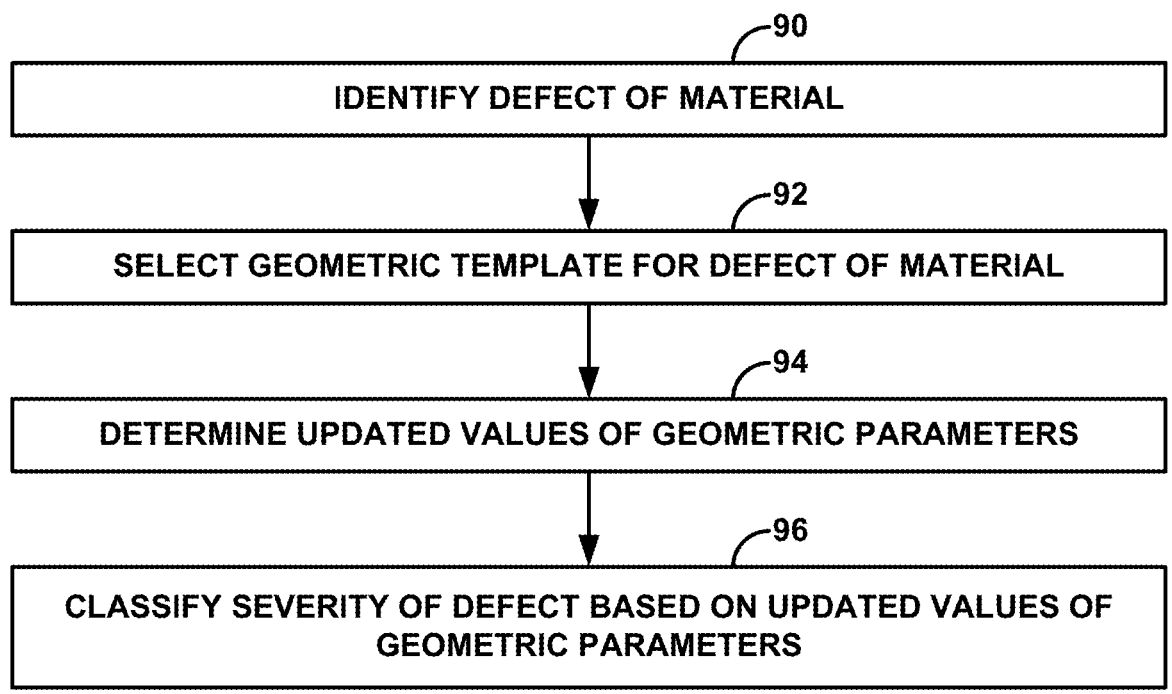
FIG. 5 is a flow diagram illustrating an example technique for classifying a severity of a defect of a material using updated values of geometric parameters for a model of the material.

In some examples, material 12 may include at least one defect. System 10 may use a hybrid model of the defect to classify the defect. FIG. 5 is a flow diagram illustrating an example technique for classifying a severity of a defect of a material using updated values of geometric parameters for a model of the material. The technique of FIG. 5 will be described with concurrent reference to system 10 of FIG. 1 and the technique of FIG. 3, although one of ordinary skill will understand that the technique of FIG. 3 may be performed by other systems that include a greater or fewer number of components, and that system 10 may perform other techniques. For example, one or more control steps performed by controller 16 may be performed manually or by using another component of system 10.

Controller 16 may identify one or more defects in material 12 (90). In some examples, controller 16 may identify the at least one defect from the three-dimensional representation of material 12. For example, controller 16 may be configured to determine coordinates of the three-dimensional representation that exceed an anticipated or allowed deviation. For example, material 12 may be a woven fabric in which one or more tows has a raised surface that deviates from a desired form of the tow. Controller 16 may evaluate the three-dimensional representation to identify coordinates that exceed a parameter. For example, the parameter may be a distance of a tow from an average centerline of the tow.

Controller 16 may select a geometric template based on the identity of the at least one defect (92). For example, a defect may have structural and functional properties that may be represented by geometric parameters that are different from geometric parameters of a geometric template of a material that does not include the defect, such that a geometric template specific to the defect may be selected. Controller 16 may select, such as from database, the geometric template of the at least one defect. For example, controller 16 may be configured to send a request to a computing device that includes the database for the geometric template of the at least one defect.

Controller 16 may determine updated values of geometric parameters of a model of the material that includes the defect based on the three-dimensional representation of material 12 (94). For example, controller 16 may use the technique of FIG. 3 to determine updated values of geometric parameters of the model.

Controller 16 may classify a severity of the defect based on the updated values of the geometric parameters. For example, controller 16 may execute a hybrid model of material 12 that includes the defect and determine whether material 12 that includes the defect within a tolerance, as described in (80) and (82) of FIG. 4 above. Controller 16 may determine a classification of the severity of the defect based on whether the defect is within one or more tolerances. For example, if the defect is not within a minor dimensional tolerance, controller 16 may classify the defect as having a minor severity. Controller 16 may output an indication of the severity classification.

By using a hybrid model for a material that includes a defect, controller 16 may more accurately evaluate a severity of the defect as compared to systems that do not use defect-specific geometric template information. For example, controller 16 may more accurately represent dimensions of a defect using the three-dimensional representation of the defect, while the use of a defect-specific model may result in a more accurate representation of the behavior of the defect.

Working Examples

Various two-dimensional images were used to evaluate accuracy of various modeling techniques, including the techniques discussed herein. The two-dimensional images included pixelated and smooth images. The two-dimensional images were voxelized, such as by corresponding a depth to the two-dimensional images. The voxelized versions were evaluated by various models. The models were parameterized with a geometric parameter of a radius, such that a resulting model includes an approximation of a circle. The models were evaluated for a proximity of a center point of the circle to a center point of the voxelized image.

Figure 6A:
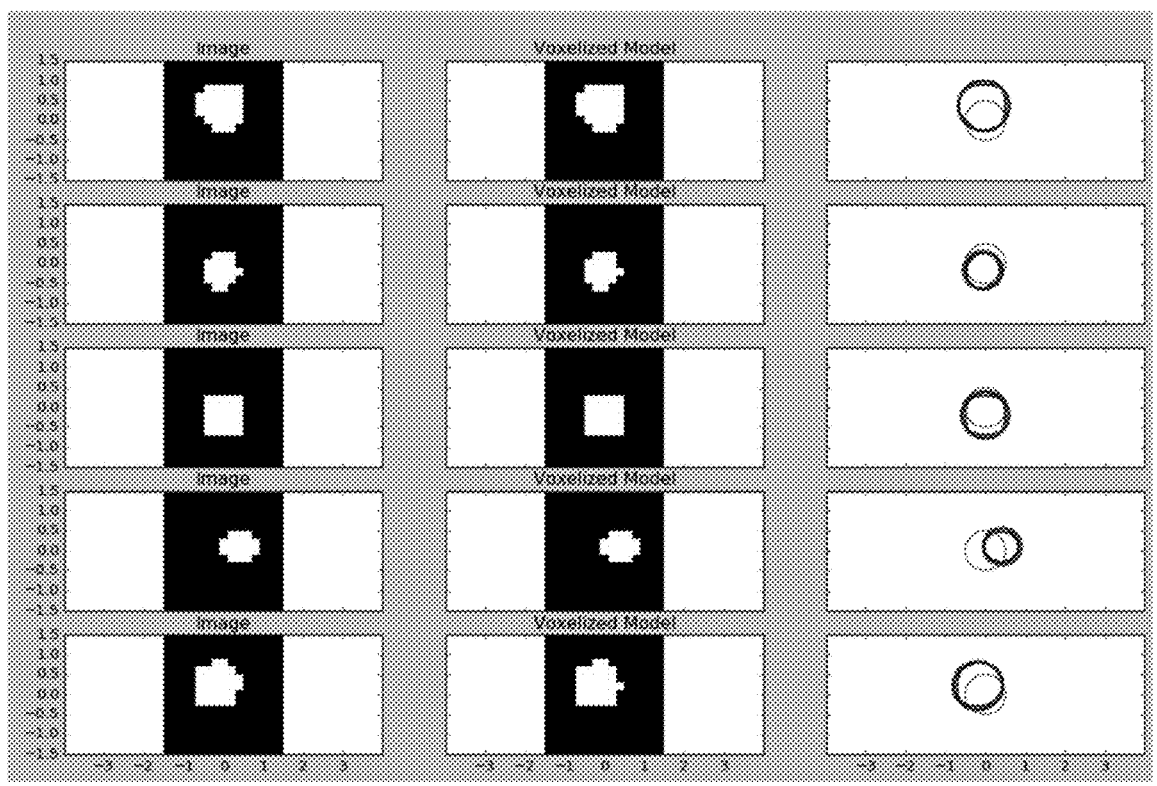
FIG. 6A is an exemplary chart of pixelated images, voxelized versions of the pixelated images, and models of the pixelated images determined using various techniques.
Figure 6B:
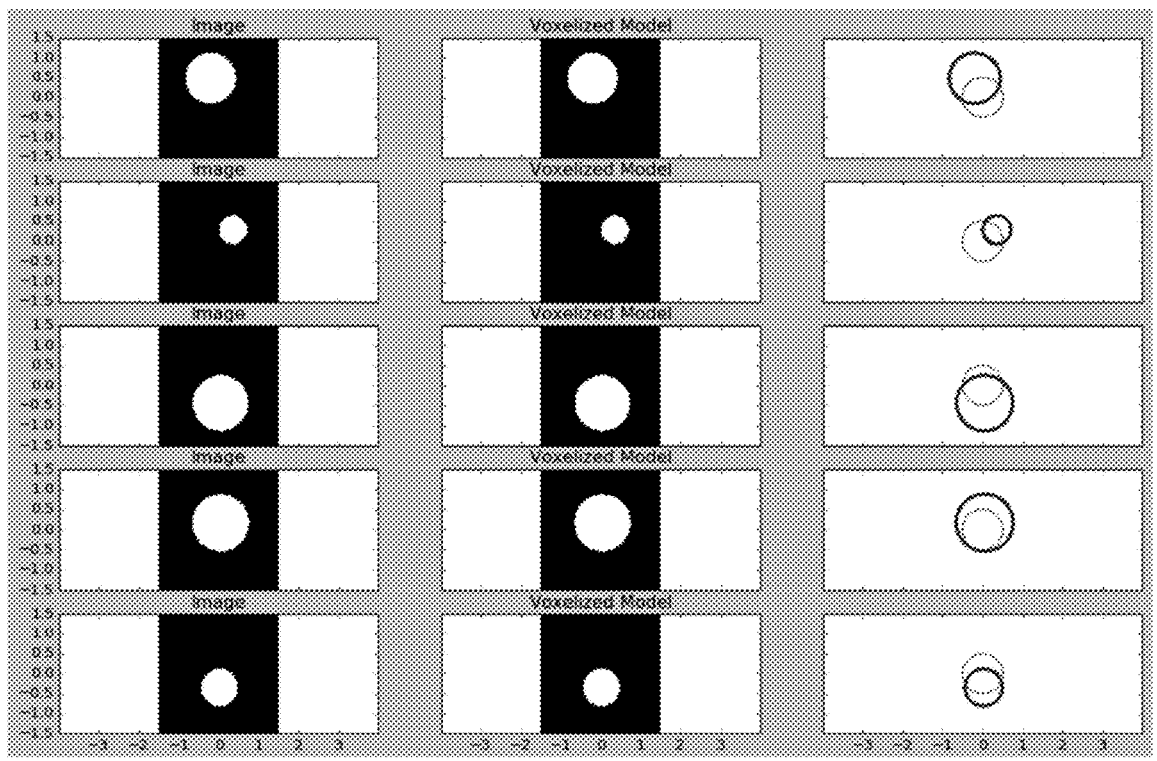
FIG. 6B is an exemplary chart of smoothed images, voxelized versions of the smoothed images, and models of the smoothed images determined using various techniques.

FIG. 6A is an exemplary chart of pixelated images, voxelized versions of the pixelated images, and models of the pixelated images determined using various techniques. FIG. 6B is an exemplary chart of smoothed images, voxelized versions of the smoothed images, and models of the smoothed images determined using various techniques. For each of FIG. 6A and FIG. 6B, a green line represents the actual geometry of a circle centered at the center point of the voxelized image, a red line represents a starting model, a blue line represents a marching cubes model, and a black line represents a hybrid model as discussed herein.

As seen in FIG. 6A, for each pixelated image, the hybrid model (black) more closely approximated the actual geometry of the circle (green) centered at the center point of the pixelated image than the starting model (red) and the marching cubes model (blue). As seen in FIG. 6B, for each smoothed image, the hybrid model (black) much more closely approximated the actual geometry of the circle (green) centered at the center point of the pixelated image than the starting model (red) and the marching cubes model (blue).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method, comprising:
   executing, by a controller, a model of a material based on a geometric template of the material defined by geometric parameters and at least one geometric constraint of the material, wherein the material comprises at least two physical domains;
   determining, by the controller, a value of an objective function based on differences between a three-dimensional representation of the material based on measurements of the material and the model of the material based on the geometric template of the material, wherein the differences between the three-dimensional representation and the model are determined by, for each of a plurality of controls points of the material:
      determining respective representation coordinates for each data point of a set of data points of the three-dimensional representation corresponding to the control point of the material;
      determining respective model coordinates for each data point of a set of data points of the model corresponding to the control point of the material; and
      determining respective differences between the respective representation coordinates of the three-dimensional representation and the respective model coordinates of the model;
   determining, by the controller, updated values of the geometric parameters of the geometric template;
   iterating, by the controller, the executing the model of the material, the determining the value of the objective function, and the determining the updated values of the geometric parameters until a parameter associated with the objective function satisfies a criterion; and
   outputting, by the controller and in response to the parameter associated with the objective function satisfying the criterion, the updated values of the geometric parameters associated with the objective function that satisfies the criterion.

2. The method of claim 1, further comprising:
   executing, by the controller, a hybrid model of the material based on the updated values of the geometric parameters; and
   determining, by the controller, whether the material is within a dimensional tolerance based on the hybrid model of the material.

3. The method of claim 2, further comprising:
   determining, by the controller and in response to determining that the material is within the dimensional tolerance, at least one machining path of a component fabrication device associated with the material based on the hybrid model of the material; and
   machining, by the component fabrication device, a component comprising the material based on the at least one machining path.

4. The method of claim 2, further comprising:
   accepting, in response to determining the material is within the dimensional tolerance, the material; and
   rejecting, in response to determining the material is not within the dimensional tolerance, the material.

5. The system of claim 1, wherein at least one data point of the set of data points of the three-dimensional representation and at least one data point of the set of data points of the model corresponds to a boundary of the material.

6. The method of claim 1, wherein the objective function is represented by the following equation:

$$O(x_i) = \sum_{j=0}^{n} (I_j - T_j)^2$$

wherein $x_i$ represents the geometric parameters, $O(x_i)$ represents the value of the objective function, n represents a number of the three-dimensional representation, j represents an initial value, $I_j$ represents the data points of the three-dimensional representation, and $T_j$ represents the corresponding data points of the model.

7. The method of claim 1, wherein the material includes at least one defect, wherein the geometric template comprises a geometric template for the at least one defect, wherein the model comprises a model of the at least one defect, and further comprising:
  identifying, by the controller, the at least one defect from the three-dimensional representation of the material;
  selecting, by the controller, the geometric template of the at least one defect; and
  classifying, by the controller, a severity of the at least one defect based on the updated geometric parameters.

8. The method of claim 1, wherein the three-dimensional representation of the material comprises at least one of x-ray computed tomography (CT) scan images, ultrasound CT scan images, ultrasound transmission tomography scan images, neutron tomography scan images, terahertz tomography scan images, and infrared images.

9. The method of claim 1, wherein the material comprises at least one of a woven material, a rigidized ceramic preform, and ceramic matrix composite component.

10. The method of claim 1, wherein the at least one geometric constraint comprises at least one of a dimension, a control point, a boundary, or an orientation of a physical domain of the material.

11. A system, comprising:
  a controller configured to:
    execute a model of a material based on a geometric template of the material defined by geometric parameters and at least one geometric constraint of the material, wherein the material comprises at least two physical domains;
    determine a value of an objective function based on differences between a three-dimensional representation of the material based on measurements of the material and the model of the material based on the geometric template of the material, wherein the differences between the three-dimensional representation and the model are determined by, for each of a plurality of controls points of the material:
      determining respective representation coordinates for each data point of a set of data points of the three-dimensional representation corresponding to the control point of the material;
      determining respective model coordinates for each data point of a set of data points of the model corresponding to the control point of the material; and
      determining respective differences between the respective representation coordinates of the three-dimensional representation and the respective model coordinates of the model;
    determine updated values of the geometric parameters of the geometric template;
    iterate the execute the model of the material, the determine the value of the objective function, and the determine the updated values of the geometric parameters until a parameter associated with the objective function satisfies a criterion; and
    output, in response to the parameter associated with the objective function satisfying the criterion, the updated values of the geometric parameters associated with the objective function that satisfies the criterion.

12. The system of claim 11, wherein the controller is further configured to:
  execute a hybrid model of the material based on the updated values of the geometric parameters; and
  determine whether the material is within a dimensional tolerance based on the hybrid model of the material.

13. The system of claim 12, wherein the controller is further configured to determine, in response to determining that the material is within the dimensional tolerance, at least one machining path of the component fabrication device associated with the material based on the hybrid model of the material.

14. The system of claim 13, further comprising a component fabrication device configured to machine a component comprising the material based on the at least one machining path.

15. The system of claim 11, wherein the at least one geometric constraint comprises at least one of a dimension limit, a boundary condition, or an orientation of a physical domain of the material.

16. The system of claim 11, wherein the material includes at least one defect, wherein the geometric template comprises a geometric template for the at least one defect, wherein the model comprises a model of the at least one defect, and wherein the controller is further configured to:
  identify the at least one defect from the three-dimensional representation of the material;
  select the geometric template of the at least one defect; and
  classify a severity of the at least one defect based on the updated geometric parameters.

17. The system of claim 11, wherein the material is a portion of a component that comprises at least one of a woven material, a rigidized ceramic preform, and ceramic matrix composite component.

18. A non-transitory computer-readable storage medium storing instructions that, when executed, cause at least one processor to:
  execute a model of a material based on a geometric template of the material defined by geometric parameters and at least one geometric constraint of the material, wherein the material comprises at least two physical domains;
  determine a value of an objective function based on differences between a three-dimensional representation of the material based on measurements of the material and the model of the material based on the geometric template of the material, wherein the differences between the three-dimensional representation and the model are determined by, for each of a plurality of controls points of the material:
    determining respective representation coordinates for each data point of a set of data points of the three-dimensional representation corresponding to the control point of the material;
    determining respective model coordinates for each data point of a set of data points of the model corresponding to the control point of the material; and
    determining respective differences between the respective representation coordinates of the three-dimensional representation and the respective model coordinates of the model;

determine updated values of the geometric parameters of the geometric template;

iterate the execute the model of the material, the determine the value of the objective function, and the determine the updated values of the geometric parameters until a parameter associated with the objective function satisfies a criterion; and output, in response to the parameter associated with the objective function satisfying the criterion, the updated values of the geometric parameters associated with the objective function that satisfies the criterion.

* * * * *